United States Patent [19]

Calundann et al.

[11] 4,351,917

[45] Sep. 28, 1982

[54] POLY(ESTER-AMIDE) CAPABLE OF FORMING AN ANISOTROPIC MELT PHASE DERIVED FROM 6-HYDROXY-2-NAPHTHOIC ACID, AROMATIC MONOMER CAPABLE OF FORMING AN AMIDE LINKAGE, AND OTHER AROMATIC HYDROXYACID

[75] Inventors: Gordon W. Calundann, North Plainfield; Larry F. Charbonneau, Chatham; Anthony J. East, Madison, all of N.J.

[73] Assignee: Celanese Corporation, New York, N.Y.

[21] Appl. No.: 251,625

[22] Filed: Apr. 6, 1981

[51] Int. Cl.$^3$ ............................................. C08G 69/44
[52] U.S. Cl. .................................... 524/602; 528/183; 528/184; 528/185; 528/210; 528/211; 528/339; 528/344; 528/363
[58] Field of Search ................ 528/211, 210, 183–185, 528/339, 344, 363; 260/37 N; 524/602

[56] References Cited

U.S. PATENT DOCUMENTS

| | | | |
|---|---|---|---|
| 3,859,251 | 1/1975 | Kuhfuss et al. | 528/183 |
| 4,182,842 | 1/1980 | Jackson et al. | 528/184 |
| 4,272,625 | 6/1981 | McIntyre et al. | 528/183 |

*Primary Examiner*—Lester L. Lee
*Attorney, Agent, or Firm*—Charles B. Barris

[57] ABSTRACT

A melt processable poly(ester-amide) which is capable of forming an anisotropic melt phase is provided. The poly(ester-amide) of the present invention consists essentially of the recurring units (a) 6-oxy-2-naphthoyl moiety, (b) aromatic moiety capable of forming an amide linkage in the polymer, and, optionally, (c) other aromatic moiety derived from aromatic hydroxyacid, in the proportions indicated. The aromatic moiety capable of forming an amide linkage in the polymer is an amino derivative or a substituted amino derivative of an aromatic carboxylic acid. Preferably, the aromatic moiety capable of forming an amide linkage is derived from p-aminobenzoic acid. The resulting poly(ester-amide) exhibits a melting temperature below approximately 400° C., preferably below approximately 350° C. The poly(ester-amide) of the present invention is preferably formed by a melt polymerization technique.

33 Claims, No Drawings

POLY(ESTER-AMIDE) CAPABLE OF FORMING AN ANISOTROPIC MELT PHASE DERIVED FROM 6-HYDROXY-2-NAPHTHOIC ACID, AROMATIC MONOMER CAPABLE OF FORMING AN AMIDE LINKAGE, AND OTHER AROMATIC HYDROXYACID

BACKGROUND OF THE INVENTION

The use of objects molded from synthetic polymers has expanded rapidly in the last several decades. In particular, polyesters and polyamides have widely gained acceptance for general molding applications and in the formation of fibers and films. An additional class of polymers known as poly(ester-amides) has been disclosed. Such disclosures include U.S. Pat. Nos. 2,547,113; 2,946,769; 3,272,774; 3,272,776; 3,440,218; 3,475,385; 3,538,058; 3,546,178; 3,575,928; 3,676,291; 3,865,792; 3,926,923; and 4,116,943. Polyimide esters are disclosed in German Offenlegungsschrift No. 2,950,939 and in U.S. Pat. No. 4,176,223.

Although many polyesters, polyamides, and poly(ester-amides) have mechanical properties suitable for general applications, most polyesters, polyamides, and poly(ester-amides) are not suitable for high strength service because the mechanical properties are not sufficiently high. One group of polymers that are suitable for high strength service without the use of a reinforcing agent is a new class of polymers exhibiting a general overall balance of mechanical properties substantially enhanced over previous polymers. These polymers and/or their melts have been described by various terms, including "liquid crystalline," "liquid crystal," "thermotropic," "mesogenic," and "anisotropic." Briefly, the polymers of this new class are thought to involve a parallel ordering of the molecular chains. The state wherein the molecules are so ordered is often referred to either as the liquid crystal state or the nematic phase of the liquid crystal state. These polymers are prepared from monomers which are generally long, flat, and fairly rigid along the long axis of the molecule and commonly have chain extending linkages that are either coaxial or parallel.

Disclosures of polyesters which exhibit melt anisotropy include (a) *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 828,935 and 828,936, (c) Dutch Pat. No. 7505551, (d) West German Pat. Nos. 2520819, 2520820, 2722120, 2834535, 2834536, and 2834537, (e) Japanese Pat. Nos. 43-223; 2132-116; 3017-692; and 3021-293, (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,228,218; 4,230,817; 4,232,143; 4,232,144; 4,238,598; 4,238,599; 4,245,082; and 4,245,084; and (g) U.K. Application Nos. 2,002,404; 2,008,598A; and 2,030,158A. See also commonly assigned U.S. Ser. Nos. 54,049, filed July 2, 1979, now U.S. Pat. No. 4,256,624; 91,003, filed Nov. 5, 1979; 109,573, filed Jan. 4, 1980, now U.S. Pat. No. 4,265,802; 109,575, filed Jan. 4, 1980 (now U.S. Pat. No. 4,285,852); 128,759, filed Mar. 10, 1980, now U.S. Pat. No. 4,279,756; 128,778, filed Mar. 10, 1980 (now U.S. Pat. No. 4,279,803); and 169,014, filed July 15, 1980.

Representative disclosures of liquid crystalline polyamide dopes include U.S. Pat. Nos. 3,673,143; 3,748,299; 3,767,756; 3,801,528; 3,804,791; 3,817,941; 3,819,587; 3,827,998; 3,836,498; 4,016,236; 4,018,735; 4,148,774; and Re. 30,352.

U.S. Pat. No. 4,182,842 discloses poly(ester-amides) prepared from an aromatic dicarboxylic acid, ethylene glycol, and a p-acylaminobenzoic acid. Such poly(ester-amides) are also disclosed in "Liquid Crystal Polymers. III. Preparation and Properties of Poly(Ester-Amides) from p-Aminobenzoic Acid and Poly(Ethylene Terephthalate)", by W. J. Jackson, Jr. and H. F. Kuhfuss, *J. Appl. Polym. Sci.*, Vol. 25, No. 8, pp. 1685-94 (1980). A similar disclosure is Japan 54 125271. These references neither disclose nor suggest the poly(ester-amide) of the present invention.

European Patent Application No. 79301276.6 (Publication No. 0,007,715) discloses melt processable fiber-forming poly(ester-amides) comprising residues of one or more aminophenols selected from p-aminophenol and p-N-methylaminophenol and residues of one or more dicarboxylic acids. The poly(ester-amide) contains a balance of linear difunctional residues and dissymmetric difunctional residues derived from either the aminophenols or the acids. The linear difunctional residues and dissymmetric difunctional residues are chosen so as to give a product which melts below its decomposition temperature and exhibits optical anisotropy in the melt. This patent neither discloses nor suggests the poly(ester-amide) of the present invention which contains a 6-oxy-2-naphthoyl moiety.

U.S. Pat. No. 3,859,251 discloses a poly(ester-amide) which includes a dicarboxyl moiety which comprises 50 to 100 mole percent of units derived from an acyclic aliphatic dicarboxylic acid. Such units are not required in the poly(ester-amide) of the present invention. Moreover, while the patent discloses the inclusion of a p-oxybenzoyl moiety, there is no disclosure or suggestion of the usefulness of a poly(ester-amide) containing a 6-oxy-2-naphthoyl moiety, such as that of the present invention.

U.S. Pat. No. 3,809,679 discloses poly(ester-amides) consisting of 10 to 90 mole percent of recurring structural units derived from a dicarboxylic acid dihalide and a dihydroxy compound of a specified formula and 10 to 90 mole percent of recurring structural units derived from a dicarboxylic acid dihalide and a diamino compound of a specified formula. The poly(ester-amides) specifically exclude moieties derived from aromatic hydroxyacids, such as the 6-oxy-2-naphthoyl moiety included in the poly(ester-amide) of the present invention. Furthermore, most, if not all, of the poly(ester-amides) disclosed are not readily melt processable, and there is no disclosure of the existence of an anisotropic melt phase.

Commonly assigned U.S. Application Ser. Nos. 214,557, filed Dec. 9, 1980, entitled "Poly(ester-amide) Capable of Forming an Anisotropic Melt Phase Derived From 6-Hydroxy-2-Naphthoic Acid, Dicarboxylic Acid, and Aromatic Monomer Capable of Forming an Amide Linkage" (Inventors: Anthony J. East, Larry F. Charbonneau, and Gordon W. Calundann), and 251,629, filed Apr. 6, 1981, entitled "Poly(ester-amides) Capable of Forming an Anisotropic Melt Phase Derived From 6-Hydroxy-2-Naphthoic Acid, Other Aromatic Hydroxyacid, Carbocyclic Dicarboxylic Acid, and Aromatic Monomer Capable of Forming an Amide Linkage" (Inventors: Larry F. Charbonneau, Anthony J. East, and Gordon W. Calundann), disclose melt processable poly(ester-amides) exhibiting anisotropy in the melt phase which include an oxynaphthoyl moiety. Unlike the present invention, the poly(ester-amides) there disclosed include an additional moiety derived from a carbocyclic dicarboxylic acid. Furthermore, the amide-forming moieties there disclosed do not include a carboxylic functional group, as does the amide-forming moiety employed in the present invention. However, despite such structural differences, the poly(ester-amide) of the present invention likewise demonstrates anisotropy and excellent tractability in the melt phase.

Therefore, it is an object of the present invention to provide an improved poly(ester-amide) which is suited for the formation of quality molded articles, melt extruded fibers, and melt extruded films.

It is also an object of the present invention to provide an improved poly(ester-amide) which forms a highly tractable melt phase.

It is also an object of the present invention to provide an improved poly(ester-amide) which forms an anisotropic melt phase at a temperature well below its decomposition temperature and which may form quality fibers, films, and molded articles.

It is also an object of the present invention to provide an improved melt processable poly(ester-amide) capable of forming an anisotropic melt phase at a temperature below approximately 400° C., and preferably below approximately 350° C.

It is also an object of the present invention to provide an improved melt processable poly(ester-amide) which exhibits improved adhesion, improved fatigue resistance, and increased transverse strength.

These and other objects, as well as the scope, nature, and utilization of the present invention, will be apparent to those skilled in the art from the following detailed description.

SUMMARY OF THE INVENTION

A melt processable poly(ester-amide) capable of forming an anisotropic melt phase at a temperature below approximately 400° C. is provided. The poly(ester-amide) consists essentially of the recurring moieties I, II, and, optionally, III wherein:

I is

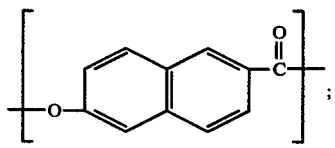

II is

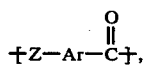

where Ar is a divalent radical comprising at least one aromatic ring, and Z is NH or NR, where R is an alkyl group of 1 to 6 carbon atoms or an aryl group; and III is

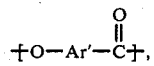

where Ar' is a divalent radical comprising at least one aromatic ring, other than naphthylene;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein moiety I is present in a concentration of approximately 10 to 90 mole percent, moiety II is present in a concentration of approximately 5 to 45 mole percent, and moiety III is present in a concentration of approximately 0 to 45 mole percent, with the total concentration of moieties I and III being within the range of approximately 55 to 95 mole percent.

DESCRIPTION OF THE PREFERRED EMBODIMENTS

The poly(ester-amide) of the present invention includes at least two recurring moieties which when combined in the poly(ester-amide) have been found to form an atypical, optically anisotropic melt phase. The polymer forms an anisotropic melt phase at a temperature below approximately 400° C. (e.g., below approximately 350° C.). The polymer melting temperatures may be confirmed by the use of a differential scanning calorimeter (i.e., DSC) employing repeat scans at a 20° C. per minute heat-up rate and by observing the peak of the DSC melt transition. The poly(ester-amide) commonly exhibits a melting temperature of at least approximately 200° C. and preferably of at least approximately 250° C. as determined by differential scanning calorimetry. The poly(ester-amide) of the present invention may exhibit more than one DSC transition temperature.

Because of its ability to exhibit anisotropic properties (i.e., liquid crystalline properties) in the melt, the poly(ester-amide) readily can form a product having a highly oriented molecular structure upon melt processing. Preferred poly(ester-amide) compositions are capable of undergoing melt processing at a temperature within the range of approximately 250° C. to 350° C., as discussed more fully hereinafter.

The poly(ester-amide) includes two essential moieties. Moiety I can be termed a 6-oxy-2-naphthoyl moiety and possesses the structural formula:

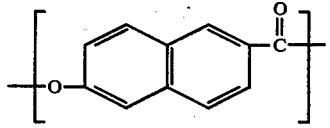

While not specifically illustrated in the structural formula, at least some of the hydrogen atoms present upon the aromatic rings of moiety I may be substituted. Representative ring substituted compounds from which moiety I can be derived include: 6-hydroxy-5-chloro-2-naphthoic acid, 6-hydroxy-5-methyl-2-naphthoic acid, 6-hydroxy-5-methoxy-2-naphthoic acid, 6-hydroxy-7-chloro-2-naphthoic acid, 6-hydroxy-5,7-dichloro-2-naphthoic acid, etc. The presence of ring substitution tends to modify to some degree the physical properties of the resulting polymer (e.g., the polymer may soften at a lower temperature, its impact strength may be improved, and the crystallinity of the solid polymer may be decreased). In a preferred embodiment wherein a poly(ester-amide) of optimum crystallinity in the solid state is desired, no ring substitution is present.

As will be apparent to those skilled in the art, moiety I can be derived from unsubstituted 6-hydroxy-2-naphthoic acid and the derivatives thereof. A convenient laboratory preparation for forming 6-hydroxy-2-naphthoic acid is described in Berichte, Vol. 58, 2835-45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of beta-naphthol.

Moiety I is present in the poly(ester-amide) of the present invention in a concentration of approximately 10 to 90 mole percent. Preferably, moiety I is present in a concentration within the range of approximately 20 to 80 mole percent, and, more preferably, within the range of approximately 30 to 70 mole percent.

The second essential moiety (i.e., moiety II) is derived from a monomer which is capable of forming an amide linkage in the polymer. Moiety II possesses the structural formula

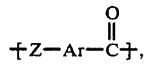

where Ar is a divalent radical comprising at least one aromatic ring, and Z is NH or NR, where R is an alkyl group of 1 to 6 carbon atoms or an aryl group. R is preferably a straightchain alkyl group of 1 to 6 carbon atoms and is more preferably a methyl group.

Moiety II is an aminocarboxyaryl moiety, wherein the amino group may be substituted or unsubstituted. Examples of monomers from which moiety II can be derived include p-aminobenzoic acid, p-N-methylaminobenzoic acid, m-aminobenzoic acid, 3-methyl-4-aminobenzoic acid, 2-chloro-4-aminobenzoic acid, 4-amino-1-naphthoic acid, 4-N-methylamino-1-naphthoic acid, 4-amino-4'-carboxydiphenyl, 4-amino-4'-carboxydiphenyl ether, 4-amino-4'-carboxydiphenyl sulfone, 4-amino-4'-carboxydiphenyl sulfide, and p-aminocinnamic acid.

Preferably, moiety II is a symmetrical aminocarboxyaryl moiety. By "symmetrical," it is meant that the divalent bonds which join the moiety to other moieties in the main polymer chain are symmetrically disposed on one or more rings (e.g., are para to each other or diagonally disposed, for example, on the 2,6 positions when present on a naphthalene ring). The preferred moiety which may serve as a symmetrical aminocarboxyaryl moiety in the poly(ester-amide) of the present invention is a moiety derived from p-aminobenzoic acid. An example of a non-symmetrical aminocarboxyaryl moiety is one derived from m-aminobenzoic acid.

Although moiety II may be substituted in the same manner as moiety I, highly satisfactory polymers can be formed wherein the aminocarboxyaryl moiety is free of ring substitution.

Moiety II is present in the poly(ester-amide) in a concentration of approximately 5 to 45 mole percent, preferably in a concentration of approximately 5 to 35 mole percent. In an especially preferred embodiment, moiety II is present in a concentration within the range of approximately 10 to 30 mole percent.

In addition to the two essential moieties described above, the poly(ester-amide) may further include an additional moiety (moiety III). Moiety III is derived from an aromatic hydroxyacid other than 6-hydroxy-2-naphthoic acid or derivatives thereof. Moiety III has the structural formula

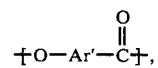

where Ar' is a divalent radical comprising at least one aromatic ring other than naphthylene. Moiety III is preferably derived from a symmetrical aromatic hydroxyacid. By "symmetrical," it is meant that the divalent bonds which join the moiety to other moieties in the main polymer chain are symmetrically disposed on one or more rings (e.g., are para to each other or diagonally disposed when present on a condensed ring system).

The preferred moiety which may serve as a symmetrical aromatic moiety derived from a hydroxyacid is a p-oxybenzoyl moiety. Although moiety III may be substituted in the same manner as moiety I, highly satisfactory polymers can be formed wherein moiety III is free of ring substitution.

Other aromatic hydroxyacids from which moiety III may be derived include 4-hydroxycinnamic acid and 4-hydroxy-3-methoxycinnamic acid (ferulic acid).

Moiety III is present in the novel poly(ester-amide) of the present invention in a concentration of approximately 0 to 45 mole percent. Preferably, moiety III is present in a concentration of at least 5 mole percent and more preferably in a concentration of at least approximately 10 mole percent. For example, in a preferred embodiment, moiety III may be present in a concentration within the range of approximately 5 to 45 mole percent and, in a more preferred embodiment, within the range of approximately 10 to 30 mole percent.

The total concentration of moieties I and III is within the range of approximately 55 to 95 mole percent. Preferably, the total molar concentration of moieties I and III is within the range of approximately 65 to 95 mole percent. In an especially preferred embodiment, the total concentration of moieties I and III is within the range of approximately 70 to 90 mole percent.

The poly(ester-amide) of the present invention may consist essentially of, for example, approximately 10 to 90 mole percent of moiety I, approximately 5 to 45 mole percent of moiety II, and approximately 0 to 45 mole percent of moiety III. Preferred compositions consist essentially of approximately 20 to 80 mole percent of moiety I, approximately 5 to 35 mole percent of moiety II, and approximately 5 to 45 mole percent of moiety III. Even more preferred are those compositions which consist essentially of approximately 30 to 70 mole percent of moiety I, approximately 10 to 30 mole percent of moiety II, and approximately 10 to 30 mole percent of moiety III.

The various moieties upon polymer formation will tend to be present in a random configuration.

The substituents, if present, on the rings of each of the moieties described above are selected from the group consisting of an alkyl group of 1 to 4 carbon atoms, an alkoxy group of 1 to 4 carbon atoms, halogen, phenyl, and mixtures of the foregoing.

Other ester-forming moieties (e.g., dicarboxy, dioxy, or hydroxycarboxy units) other than those previously discussed additionally may be included in the poly(ester-amide) of the present invention in a minor concentration so long as such moieties do not adversely influence the desired anisotropic melt phase exhibited by the poly(ester-amide) heretofore defined and do not raise the melting temperature of the resulting polymer above approximately 400° C.

The poly(ester-amide) of the present invention commonly exhibits

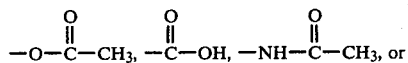

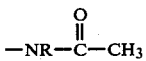

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenyl ester

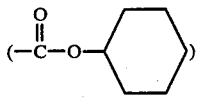

and methylester

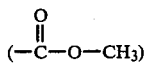

optionally may be included at the end of the polymer chains. The polymer also may be oxidatively cross-linked to at least some degree, if desired, by heating in an oxygen-containing atmosphere (e.g., in air) while in bulk form or as a previously shaped article at a temperature below its melting temperature for a limited period of time (e.g., for a few minutes).

The poly(ester-amide) of the present invention tends to be substantially insoluble in all common solvents, such as hexafluoroisopropanol and o-chlorophenol, and accordingly is not susceptible to solution processing. It can surprisingly be readily processed by common melt processing techniques as discussed hereafter. Most compositions are soluble to some degree in pentafluorophenol.

The poly(ester-amide) of the present invention commonly exhibits a weight average molecular weight of about 5,000 to about 50,000, and preferably about 10,000 to 30,000, e.g., about 15,000 to 17,500. Such molecular weight may be determined by standard techniques not involving the solutioning of the polymer, e.g., by end group determination via infrared spectroscopy on compression molded films. Alternatively, light scattering techniques in a pentafluorophenol solution may be employed to determine the molecular weight.

The poly(ester-amide) of the present invention is capable of undergoing melt processing at a temperature within the range of approximately 200° C. to 400° C. Preferably, the polymer is melt processed at a temperature within the range of approximately 250° C., to 350° C. and more preferably within the range of approximately 260° C. to 330° C.

The melting temperature (Tm) of the poly(ester-amide) of the present invention may vary widely with the composition of the poly(ester-amide).

The poly(ester-amide) prior to heat treatment additionally commonly exhibits an inherent viscosity (i.e., I.V.) of at least approximately 1.0 dl./g., and preferably at least approximately 2.0 dl./g., when measured at a concentration of 0.1 weight/volume percent in pentafluorophenol at 60° C.

The poly(ester-amide) of the present invention commonly may be considered crystalline in the sense that fibers melt extruded therefrom exhibit X-ray diffraction patterns characteristic of polymeric crystalline materials, using Ni filtered CuK α radiation and flat plate cameras. In those embodiments wherein ring substitution is present, as previously described, the polyesters may be substantially less crystalline in the solid phase and exhibit diffraction patterns typical of oriented amorphous fibers. In spite of the crystallinity commonly observed, the poly(ester-amide) of the present invention nevertheless may be easily melt processed in all instances.

The poly(ester-amide) of the present invention is readily tractable and forms an anisotropic melt phase whereby an atypical degree of order is manifest in the molten polymer. The improved tractability of the present poly(ester-amide) is due, at least in part, to the presence of moiety I, i.e., the 6-oxy-2-naphthoyl moiety. It has been observed that the tractability of the polymer is a function of the molar concentration of moiety I in the polymer.

The subject poly(ester-amide) readily forms liquid crystals in the melt phase. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40× with the sample on a Leitz hot stage and under a nitrogen atmosphere. The polymer melt is optically anisotropic, i.e., it transmits light when examined between crossed polarizers. Light is transmitted when the sample is optically anisotropic even in the static state.

The poly(ester-amide) of the present invention may be formed by a variety of techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, amine groups, acetamide groups, etc. The organic monomer compounds may be reacted in the absence of a heat-exchange fluid via a melt acidolysis procedure. They accordingly may be heated initially to form a melt solution of the reactants with the reaction continuing as solid polymer particles are formed and suspended therein. A vacuum may be applied to facilitate removal of volatiles formed during the final stage of the condensation (e.g., acetic acid or water). Such a technique is disclosed in European Patent Application No. 79301276.6 (Publication No. 0 007 715), which is herein incorporated by reference.

In commonly assigned U.S. Pat. No. 4,067,852 of Gordon W. Calundann, entitled Melt Processable Thermotropic Wholly Aromatic Polyester Containing Polyoxybenzoyl Units is described a slurry polymerization process which, although directed to the production of wholly aromatic polyesters, may be employed to form the poly(ester-amide) of the present invention. In that process, the solid product is suspended in a heat exchange medium. The disclosure of this patent is herein incorporated by reference.

When employing either the melt acidolysis procedure or the slurry procedure of U.S. Pat. No. 4,067,852, the organic monomer reactants from which the hydroxyacid moieties (i.e., moieties I and III) are derived may be initially provided in a modified form whereby the usual hydroxyl groups of these monomers are esterified (i.e., they are provided as acyl esters). For instance, lower acyl esters of 6-hydroxy-2-naphthoic acid wherein the hydroxyl group is esterified may be provided as reactants. The lower acyl groups preferably have from about 2 to about 4 carbon atoms. Preferably, the acetate esters of the organic compounds which form moieties I and III are provided. In addition, the amine group of moiety II may be provided as a lower acyl amide. Accordingly, particularly preferred reactants for the condensation reaction include 6-acetoxy-2-naphthoic acid, p-acetoxybenzoic acid, and p-acetamidobenzoic acid.

Representative catalysts which optionally may be employed in either the melt acidolysis procedure or in the procedure of U.S. Pat. No. 4,067,852 include alkyl tin oxide (e.g., dibutyl tin oxide), diaryl tin oxide, alkyl tin acids, acyl esters of tin, titanium dioxide, alkoxy titanium silicates, titanium alkoxides, alkali and alkaline earth metal salts of carboxylic acids (e.g., sodium acetate), the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.12 percent by weight.

The molecular weight of a previously formed polyester may be further increased via a solid state polymerization procedure.

The poly(ester-amide) of the present invention readily can be melt processed by common melt processing techniques to form quality molded articles, melt extruded fibers, and melt extruded films.

A molding compound may be formed from the poly(ester-amide) of the present invention which incorporates approximately 1 to 60 percent by weight of a solid filler and/or reinforcing agent.

When forming a filamentary material or film the molten poly(ester-amide) of the present invention is extruded through an appropriate shaped orifice. For instance, a spinneret such as is used in the melt spinning of polyethylene terephthalate, containing 1 to 2000 holes (e.g., 6 to 1500 holes) having a diameter of about 1 to 60 mils (e.g., 5 to 40 mils) may be utilized. Yarns of about 20 to 200 continuous filaments are commonly formed. The melt-spinnable poly(ester-amide) is supplied to the extrusion orifice at a temperature above its melting temperature, e.g., a temperature of about 270° C. to 330° C. in preferred embodiments.

Subsequent to extrusion through the shaped orifice, the resulting filamentary material or film is passed in the direction of its length through a solidification or quench zone wherein the molten filamentary material or film is transformed into a solid filamentary material or film. The resulting fibers commonly have a denier per filament of about 2 to 40, and preferably a denier per filament of about 3 to 5.

The resulting filamentary material or film optionally may be subjected to a thermal treatment whereby its physical properties are further enhanced. The tenacity of the fiber or film generally is increased by such thermal treatment. More specifically, the fibers or films preferably may be thermally treated in an inert atmosphere (e.g., nitrogen, argon, helium) or alternatively in a flowing oxygen-containing atmosphere (e.g., air) with or without stress at a temperature below the polymer melting temperature until the desired property enhancement is achieved. Thermal treatment times commonly range from a few minutes to several days. Generally, as the product is thermally treated, its melting temperature progressively is raised. The temperature of the atmosphere may be staged or continuously increased during the thermal treatment or held at a constant level. For instance, the product may be heated at 250° C. for one hour, at 260° C. for one hour, and at 270° C. for one hour. Alternatively, the product may be heated at about 10° C. to 20° C. below the temperature at which it melts for about 45 hours. Optimal heat treatment conditions will vary with the specific composition of the poly(ester-amide) and with the process history of the product.

The as-spun fibers formed from the poly(ester-amide) of the present invention are fully oriented and exhibit highly satisfactory physical properties which render them suitable for use in high performance applications. The as-spun fibers commonly exhibit an average single filament tenacity of at least 1 gram per denier (e.g., about 3 to 10 grams per denier) and an average single filament tensile modulus of at least about 200 grams per denier (e.g., about 300 to 800 grams per denier) and exhibit an extraordinary dimensional stability at elevated temperature (e.g., at temperatures of about 150° to 200° C.). Following thermal treatment (i.e., annealing), the fibers commonly exhibit an average single filament tenacity of at least 5 grams per denier (e.g., 15 to 40 grams per denier). Such properties enable the fibers to be used with particular advantage as tire cords and in other industrial applications, such as conveyor belts, hose, rope, cabling, resin reinforcement, etc. Films formed of the polyester of the present invention may be used as strapping tape, cable wrap, magnetic tape, electric motor dielectric film, etc. The fibers and films exhibit an inherent resistance to burning.

It is anticipated that the poly(ester-amide) compositions of the present invention will exhibit improved adhesion, improved fatigue resistance, and increased transverse strength over known polymers, such as wholly aromatic polyesters.

The following Examples are presented as specific illustrations of the claimed invention. It should be understood, however, that the invention is not limited to the specific details set forth in the Examples.

EXAMPLE 1

This Example illustrates the preparation of a poly(ester-amide) from 6-hydroxy-2-naphthoic acid, p-aminobenzoic acid, and p-hydroxybenzoic acid (or derivatives thereof) in the molar ratio 60:20:20.

A 300 ml. 3-neck polymer flask was fitted with a sealed glass paddle stirrer, a gas inlet, and a distillation head and condenser. Into the flask were placed 69.0 g. (0.3 mole) of 6-acetoxy-2-naphthoic acid, 17.9 g. (0.1 mole) of p-acetamidobenzoic acid, and 18.0 g. (0.1 mole) of p-acetoxybenzoic acid. No catalyst was added.

The flask was evacuated and flushed with nitrogen three times. The flask was heated in an oil bath to 250° C. under a slow stream of nitrogen gas. The contents rapidly melted to an opaque slurry and agitation was begun. Acetic acid rapidly began to distill over and was collected in a graduated cylinder. After only 8 minutes at 250° C., 12 ml. (42% of the theoretical yield) of acetic acid had been collected, and the melt was foaming vigorously. Heating and stirring were continued for 45 minutes, by which time a total of 21 ml. (73% of the theoretical yield) of acetic acid had been collected. The temperature was raised to 280° C. and held there for 30 minutes. Initially, the melt became foamy again, but the foaming subsided as the viscosity increased. At the end of this period, a total of 24.5 ml. (86% of the theoretical yield) of acetic acid had been collected, and the temperature was raised to 320° C. The melt was held at this temperature for an additional 10 minutes, at the end of which time the total yield of acetic acid was 25 ml. (90% of theoretical). Vacuum (0.6 mm. Hg) was then slowly applied in order to minimize foaming. The melt was heated under full vacuum for 20 minutes, and the temperature was slowly raised to 340° C. The opaque melt was very viscous.

At the end of the heating cycle, the vacuum was released with nitrogen, and the flask was allowed to cool under a nitrogen atmosphere. When cool, the flask was broken, and the polymer was freed from broken glass and ground in a Wiley mill. The powdered polymer was extracted in a Soxhlet apparatus with acetone to remove low molecular weight impurities and was then dried overnight in a vacuum oven.

The polymer exhibited an inherent viscosity of 2.27 dl./g. when measured at a concentration of 0.1 weight-/volume percent in pentafluorophenol at 60° C. The polymer exhibited a glass-rubber transition inflection at 102° C. and a Tm endotherm at 277° C. when measured by differential scanning calorimetry. When the polymer was examined under a microscope utilizing crossed polarizers, an anisotropic melt was observed above approximately 285° C.

The polymer was melt spun through a 0.007 inch single hole jet at 300° C. at a throughput of 0.14 g./min. and at a take-up speed of 184 m./min. The single filament properties of the as-spun fiber were:

| Tenacity | 2.84 g./d. |
|---|---|
| Elongation | 1.3% |
| Initial Modulus | 276 g./d. |
| Denier | 20 |

EXAMPLE 2

This Example illustrates the preparation of a poly(ester-amide) from 6-hydroxy-2-naphthoic acid, p-methylaminobenzoic acid, and p-hydroxybenzoic acid (or derivatives thereof) in the ratio 60:20:20.

The apparatus used was identical to that used in Example 1. Into the flask were placed 69.0 g. (0.3 mole) of 6-acetoxy-2-naphthoic acid, 19.3 g. (0.1 mole) of p-(N-methyl)acetamidobenzoic acid, and 18.0 g. (0.1 mole) of p-acetoxybenzoic acid.

The flask was evacuated and flushed with nitrogen three times. The flask was heated at 250° C. in an oil bath. Initially, the melt was a clear brown color, but as the reaction proceeded, it rapidly became opaque as acetic acid distilled over. After 45 minutes, a total of 14 ml. (50% of theoretical yield) of acetic acid had been collected. The temperature was raised to 280° C. The melt became foamy, and the rate of agitation was increased until the foaming had subsided. After 45 minutes at 280° C., a total of 23.8 ml. (83% of theoretical) of acetic acid had been collected. The temperature was raised to 320° C. and was held there for an additional 45 minutes. At the end of this time, the melt was quite viscous, and a total of 26.2 ml. (92% of the theoretical yield) of acetic acid had been collected. The melt was raised to 340° C. for 25 minutes. Vacuum (0.6 mm. Hg) was applied for 20 minutes. The melt balled up around the stirrer shaft.

The flask was cooled under a nitrogen atmosphere, and the polymer was isolated and ground as before. The polymer exhibited an inherent viscosity of 1.59 dl./g. when measured at a concentration of 0.1 weight-/volume percent in pentafluorophenol at 60° C. The polymer exhibited a well-defined endotherm at 295° C. when measured by differential scanning calorimetry. When the polymer was examined under a microscope utilizing crossed polarizers, an anisotropic melt was observed above approximately 300° C.

The polymer was melt spun through a 0.007 inch single hole jet at 330° C. at a throughput of 0.42 g./min. and at a take-up speed of 321 m./min. The single filament properties of the as-spun fiber were:

| Tenacity | 8.0 g./d. |
|---|---|
| Elongation | 2.3% |
| Initial Modulus | 498 g./d. |
| Denier | 12.6 |

A sample was heat treated for 15 hours at 285° C. in a nitrogen atmosphere. The properties of the heat treated fiber were:

| Tenacity | 17.0 g./d. |
|---|---|
| Elongation | 4.3% |
| Initial Modulus | 530 g./d. |

EXAMPLE 3

The poly(ester-amide) described in Example 1 was again prepared under virtually identical conditions except that the vacuum cycle time was extended to 40 minutes while the temperature increased from 320° C. to 340° C. The product exhibited an inherent viscosity of 4.81 dl./g. when measured at a concentration of 0.1 weight/volume percent in pentafluorophenol at 60° C. An anisotropic melt was observed above 300° C. when the polymer was examined under a microscope utilizing crossed polarizers.

The polymer was ground in a mill and melt spun through a single 0.007 inch hole at 376° C. at a throughput of 0.14 g./min. and at a take-up speed of 40 m./min. The single filament properties of the as-spun fiber were:

| Tenacity | 6.3 g./d. |
|---|---|
| Elongation | 1.6% |
| Initial Modulus | 490 g./d. |
| Denier | 31.4 |

EXAMPLE 4

This Example illustrates the preparation of a poly(ester-amide) from 6-hydroxy-2-naphthoic acid, p-methylaminobenzoic acid, and p-hydroxybenzoic acid (or derivatives thereof) in the molar ratio 60:30:10.

As in Example 1, the reaction flask was charged with 69.0 g. (0.3 mole) of 6-acetoxy-2-naphthoic acid, 29.0 g. (0.15 mole) of 4-(N-methyl)acetamidobenzoic acid, and 9.0 g. (0.05 mole) of 4-acetoxybenzoic acid.

The polymerization was carried out under the same time and temperature conditions as in Example 2, except that the final vacuum cycle lasted 32 minutes, the temperature being steadily raised from 320° C. at the start to 340° C. at the end. The pale tan opaque melt had a "pearly" appearance and upon solidification had a "woody" fracture.

After isolation and grinding, the polymer exhibited an inherent viscosity of 1.03 dl./g. when measured at a concentration of 0.1 weight/volume percent in pentafluorophenol at 60° C. The polymer exhibited a glass-rubber transition inflection at 110° C. and a $T_m$ endotherm at 310° C. when measured by differential scanning calorimetry. When the polymer was examined under a microscope utilizing crossed polarizers, an anisotropic melt was observed above 320° C.

The polymer was melt spun through a 0.007 inch single hole jet at 360° C. at a throughput of 0.42 g./min. and at a take-up speed of 199 m./min. The single filament properties of the as-spun fiber were:

| Tenacity | 6.7 g./d. |
| --- | --- |
| Elongation | 2.1% |
| Initial Modulus | 431 g./d. |
| Denier | 23.7 |

The fiber was heat treated at 300° C. for eight hours in a nitrogen atmosphere. The heat treated fiber exhibited the following properties:

| Tenacity | 14.3 g./d. |
| --- | --- |
| Elongation | 3.4% |
| Initial Modulus | 481 g./d. |

Although the invention has been described with preferred embodiments, it is to be understood that variations and modifications may be employed as will be apparent to those of ordinary skill in the art. Such variations and modifications are to be considered within the purview and scope of the claims appended hereto.

We claim:

1. A melt processable poly(ester-amide) capable of forming an anisotropic melt phase at a temperature below approximately 400° C. consisting essentially of recurring moieties I, II, and, optionally, III wherein:

I is

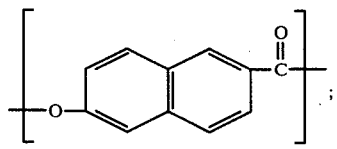

II is

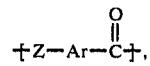

where Ar is a divalent radical comprising at least one aromatic ring, and Z is NH or NR, where R is an alkyl group of 1 to 6 carbon atoms or an aryl group; and III is

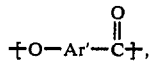

where Ar' is a divalent radical comprising at least one aromatic ring, other than naphthylene;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein moiety I is present in a concentration of approximately 10 to 90 mole percent, moiety II is present in a concentration of approximately 5 to 45 mole percent, and moiety III is present in a concentration of approximately 0 to 45 mole percent, with the total concentration of moieties I and III being within the range of approximately 55 to 95 mole percent.

2. The poly(ester-amide) of claim 1 which is capable of forming an anisotropic melt phase at a temperature below approximately 350° C.

3. The poly(ester-amide) of claim 1 which exhibits an inherent viscosity of at least approximately 1.0 dl./g. when measured at a concentration of 0.1 weight/volume percent in pentafluorophenol at 60° C.

4. The poly(ester-amide) of claim 3 which exhibits an inherent viscosity of at least approximately 2.0 dl./g. when measured at a concentration of 0.1 weight/volume percent in pentafluorophenol at 60° C.

5. The poly(ester-amide) of claim 1 wherein moiety I is present in a concentration within the range of approximately 20 to 80 mole percent.

6. The poly(ester-amide) of claim 1 wherein moiety II is present in a concentration within the range of approximately 5 to 35 mole percent.

7. The poly(ester-amide) of claim 1 wherein moiety III is present in a concentration of at least approximately 5 mole percent.

8. The poly(ester-amide) of claim 7 wherein moiety III is present in a concentration of at least approximately 10 mole percent.

9. A molding compound comprising the melt processable poly(ester-amide) of claim 1 which incorporates approximately 1 to 60 percent by weight of a solid filler and/or reinforcing agent.

10. A molded article comprising the melt processable poly(ester-amide) of claim 1.

11. A fiber which has been melt spun from the poly(ester-amide) of claim 1.

12. A film which has been melt extruded from the poly(ester-amide) of claim 1.

13. A melt processable wholly aromatic poly(ester-amide) capable of forming an anisotropic melt phase at a temperature below approximately 400° C. consisting essentially of recurring moieties I, II, and III wherein:

I is

II is

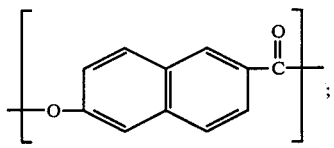

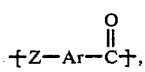

where Ar is a divalent radical comprising at least one aromatic ring, and Z is NH or NR, where R is an alkyl group of 1 to 6 carbon atoms or an aryl group; and III is

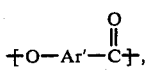

where Ar' is a divalent radical comprising at least one aromatic ring, other than naphthylene; wherein at least some of the hydrogen atoms present upon the aromatic rings optionally may be replaced by substitution selected from the group consisting of an alkyl group of 1 to 4 carbon atoms, an alkoxy group of 1 to 4 carbon atoms, halogen, phenyl, and mixtures thereof, and wherein moiety I is present in a concentration of approximately 20 to 80 mole percent, moiety II is present in a concentration of approximately 5 to 35 mole percent, and moiety III is present in a concentration of approximately 5 to 45 mole percent, with the total concentration of moieties I and III being within the range of approximately 65 to 95 mole percent.

14. The wholly aromatic poly(ester-amide) of claim 13 which is capable of forming an anisotropic melt phase at a temperature below approximately 350° C.

15. The wholly aromatic poly(ester-amide) of claim 13 which exhibits an inherent viscosity of at least approximately 1.0 dl./g. when measured at a concentration of 0.1 weight/volume percent in pentafluorophenol at 60° C.

16. The wholly aromatic poly(ester-amide) of claim 15 which exhibits an inherent viscosity of at least approximately 2.0 dl./g. when measured at a concentration of 0.1 weight/volume percent in pentafluorophenol at 60° C.

17. The wholly aromatic poly(ester-amide) of claim 13 wherein moiety I is present in a concentration within the range of approximately 30 to 70 mole percent.

18. The wholly aromatic poly(ester-amide) of claim 13 wherein moiety II is present in a concentration within the range of approximately 10 to 30 mole percent.

19. The wholly aromatic poly(ester-amide) of claim 13 wherein moiety III is present in a concentration within the range of approximately 10 to 30 mole percent.

20. A molding compound comprising the melt processable poly(ester-amide) of claim 13 which incorporates approximately 1 to 60 percent by weight of a solid filler and/or reinforcing agent.

21. A molded article comprising the melt processable poly(ester-amide) of claim 13.

22. A fiber which has been melt spun from the poly(ester-amide) of claim 13.

23. A film which has been melt extruded from the poly(ester-amide) of claim 13.

24. A melt processable wholly aromatic poly(ester-amide) capable of forming an anisotropic melt phase at a temperature below approximately 400° C. consisting essentially of recurring moieties I, II, and III wherein:

I is

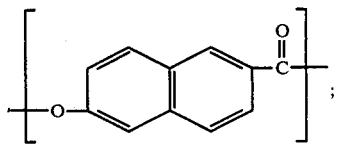

II is

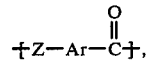

where Ar is a divalent radical comprising at least one aromatic ring, and Z is NH or NR, where R is an alkyl group of 1 to 6 carbon atoms or an aryl group; and III is

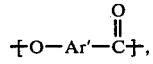

where Ar' is a divalent radical comprising at least one aromatic ring, other than naphthylene; wherein at least some of the hydrogen atoms present upon the aromatic rings optionally may be replaced by substitution selected from the group consisting of an alkyl group of 1 to 4 carbon atoms, an alkoxy group of 1 to 4 carbon atoms, halogen, phenyl, and mixtures thereof, and wherein moiety I is present in a concentration of approximately 30 to 70 mole percent, moiety II is present in a concentration of approximately 10 to 30 mole percent, and moiety III is present in a concentration of approximately 10 to 30 mole percent, with the total concentration of moieties I and III being within the range of approximately 70 to 90 mole percent.

25. The wholly aromatic poly(ester-amide) of claim 24 which is capable of forming an anisotropic melt phase at a temperature below approximately 350° C.

26. The wholly aromatic poly(ester-amide) of claim 24 which exhibits an inherent viscosity of at least approximately 1.0 dl./g. when measured at a concentration of 0.1 weight/volume percent in pentafluorophenol at 60° C.

27. The wholly aromatic poly(ester-amide) of claim 26 which exhibits an inherent viscosity of at least approximately 2.0 dl./g. when measured at a concentration of 0.1 weight/volume percent in pentafluorophenol at 60° C.

28. The wholly aromatic poly(ester-amide) of claim 24 wherein said moiety II is derived from p-aminobenzoic acid.

29. The wholy aromatic poly(ester-amide) of claim 24 wherein said moiety III is a p-oxybenzoyl moiety.

30. A molding compound comprising the melt processable poly(ester-amide) of claim 24 which incorporates approximately 1 to 60 percent by weight of a solid filler and/or reinforcing agent.

31. A molded article comprising the melt processable poly(ester-amide) of claim 24.

32. A fiber which has been melt spun from the poly(ester-amide) of claim 24.

33. A film which has been melt extruded from the poly(ester-amide) of claim 24.

* * * * *